United States Patent Office 3,409,679
Patented Nov. 5, 1968

3,409,679
FLUORINE-CONTAINING TRIOLS
Hsien Ying Niu, Southgate, and Lester G. Lundsted, Grosse Ile, Mich., and Wilbert H. Urry, Chicago, Ill., assignors to Wyandotte Chemicals Corporation, Wyandotte, Mich., a corporation of Michigan
No Drawing. Continuation-in-part of application Ser. No. 572,213, Aug. 15, 1966. This application Nov. 6, 1967, Ser. No. 680,963
4 Claims. (Cl. 260—633)

ABSTRACT OF THE DISCLOSURE

Novel fluorine-containing triols may be prepared by the reaction of certain fluorine-containing ketones with isobutylene in a mole ratio of ketone to isobutylene of at least 3:1. The triols so prepared are useful intermediates in the preparation of flame-retardant polymers, have selective pesticidal activity, and may be oxyalkylated to yield surface active agents.

---

This application is a continuation-in-part of U.S. patent application Ser. No. 572,213, filed Aug. 15, 1966, and now abandoned.

The present invention relates to novel fluorine-containing triols. More particularly, the invention relates to triols prepared by the reaction of certain fluorine-containing ketones with isobutylene in a mole ratio of ketone to isobutylene of at least 3:1.

The reaction of fluorine-containing ketones with olefins is well known in the art as evidenced by H. R. Davis, Abstracts of the 140th Meeting of American Chemical Society, Chicago, Illinois, September 1961, page 25M, and U.S. Patent No. 3,324,187. The above references illustrate the preparation of monohydric and dihydric alcohols by the reaction of olefins with perhalogenated ketones.

In accordance with the present invention, it has now been determined that novel fluorine-containing triols may be prepared in a one-step process which comprises the reaction, at temperatures between 150° C. and 300° C. for at least twelve hours, of certain fluorinated ketones with isobutylene in a mole ratio of ketone to olefin of at least 3:1. It is quite unexpected and surprising that the novel triols are obtained in accordance with the present invention, particularly since isobutylene is the only olefin which has been found to react with the ketones to yield triols. The compounds of the present invention are characterized by three hydroxyl groups and by unsaturation and may be represented by the formula

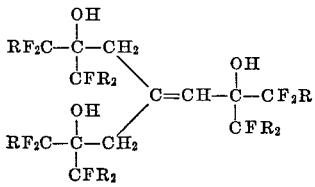

wherein R is selected from the group consisting of fluorine, chlorine, hydrogen, and alkyl having from 1 to 4 carbon atoms with the proviso that at least one R in each

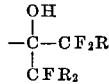

group is fluorine.

The fluorine-containing ketones which may be employed in the preparation of the triols of the present invention may be represented by the formula

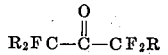

wherein R is selected from the group consisting of fluorine, chlorine, hydrogen, and alkyl having from 1 to 4 carbon atoms with the proviso that at least one R is fluorine. It is apparent that the ketones employed in the invention must contain at least four fluorine atoms. Representative ketones include hexafluoroacetone, 1,1,1,3,3-pentafluoroacetone, 1,1,1,3,3-pentafluoro-3-chloroacetone, 1,1,1,3-tetrafluoro - 3,3 - dichloroacetone, 1,1,3,3 - tetrafluoro-1,3-dichloroacetone, 1,1,1,3-tetrafluoroacetone, 1,1, 3,3 - tetrafluoroacetone, 1,1,1,3 - tetrafluoro - 2 - butanone, 2,2,4,4-tetrafluoro-3-pentanone, and 2,2,4,4-tetrafluoro-3-hexanone. As is apparent, a variety of ketones may be employed in the preparation of the polyols of the present invention. The critical characterization of the operable ketones is the presence of at least four fluorine atoms on the carbon atoms which are adjacent to the carbonyl group. The ketones preferably employed in the present invention include hexafluoroacetone, 1,1,1,3,3-pentafluoro-3 - chloroacetone, 1,1,3,3 - tetrafluoro - 1,3 - dichloroacetone, and 1,1,1,3- and 1,1,3,3-tetrafluoroacetone.

A number of triols may be prepared in accordance with the present invention. An example of one such triol is 1,1,1,7,7,7 - hexafluoro - 2,6 - bis(trifluoromethyl) - 4-(3,3,3 - trifluoro - 2 - hydroxy - 2 - trifluoromethylpropyl)-3-heptene-2,6-diol. This triol may be prepared by the reaction, at a temperature of 200° C. for 60 hours, of isobutylene with hexafluoroacetone in a mole ratio of hexafluoroacetone to isobutylene of 3:1. Another triol of the present invention, prepared by the reaction, at a temperature of about 200° C. for 60 hours, of isobutylene with 1,1,3,3-tetrafluoro-1,3-dichloroacetone is 1,1,7,7-tetrafluoro - 1,7 - dichloro - 2,6 - bis(chlorodifluoromethyl) - 4 - (3,3 - difluoro - 3 - chloro - 2 - hydroxy - 2-chlorodifluoromethylpropyl)-3-heptene-2,6-diol.

The triols of the present invention are generally prepared at temperatures between about 150° C. and 300° C., preferably between 200° C. and 250° C. Although the reaction may be conducted at atmospheric pressure, the physical nature of the reactants allows for conducting the reaction in a sealed container and thus pressure may and generally will develop. The time of the reaction will vary, depending upon the temperature, the pressure, and the catalyst employed, if any. Generally, however, from 12 hours to 200 hours, preferably from 48 hours to 150 hours, will be sufficient time to assure that the reaction is completed. After the reaction is completed, the polyol may be separated from the reaction mixture by any standard technique such as recrystallization. If desired, various solvents inert to the reactants and to the products may be employed in the process of the present invention.

The following examples serve to illustrate the invention. All parts are by weight unless otherwise stated.

EXAMPLE I

A sealed reaction vessel equipped with a thermometer, a stirrer, a pressure gage, an inlet valve, and a heat exchange means was cooled to —70° C. Into the vessel were distilled 90 parts (0.54 mole) of hexafluoroacetone and 6.7 parts (0.12 mole) of isobutylene. Heat was then applied to the reaction mixture, bringing the mixture to 209° C., at which temperature the mixture was maintained for about 150 hours. A solid product (62.8 parts) was obtained which, after recrystallization from carbon tetrachloride, had a melting point of 106° C. to 107° C. and analyzed as 1,1,1,7,7,7 - hexafluoro - 2,6 - bis(trifluoromethyl) - 4 - (3,3,3 - trifluoro - 2 - hydroxy - 2 - trifluoromethylpropyl)-3-heptene-2,6-diol. The yield of the product was 91% of theory. The structure of the product was confirmed by elemental analyses and from nuclear magnetic resonance spectra.

*Analysis.*—Calculated for $C_{13}H_8F_{18}O_3$: C, 28.17; H, 1.46; F, 61.71. Found: C, 28.3; H, 1.6; F, 61.7.

EXAMPLE II

Following the procedure of Example I, 8.4 parts (0.15 mole) of isobutylene and 77 parts (0.46 mole) of hexafluoroacetone were reacted at 200° C. for 60 hours. The solid product obtained (63.6 parts, 76% of theory) melted at 104° C. to 106° C. and analyzed as 1,1,1,7,7,7-hexafluoro-2,6-bis(trifluoromethyl)-4-(3,3,3 - trifluoro - 2-hydroxy-2-trifluoromethylpropyl)-3-heptene-2,6-diol. The structure of the product was confirmed by elemental analyses and from nuclear magnetic resonance spectra.

*Analysis.*—Calculated for $C_{13}H_8F_{18}O_3$: C, 28.17; H, 1.46; F, 61.71. Found: C, 28.28; H, 1.59; F, 63.20.

EXAMPLE III

Following the procedure of Example I, 8.4 parts (0.15 mole) of isobutylene and 91.5 parts (0.46 mole) of 1,3-dichloro-1,1,3,3-tetrafluoroacetone are reacted at 210° C. for 100 hours. The solid product obtained analyzed as 1,1,7,7-tetrafluoro-1,7-dichloro - 2,6 - bis(chlorodifluoromethyl)-4-(3,3-difluoro-3-chloro-2-hydroxy - 2 - chlorodifluoromethylpropyl)-3-heptene-2,6-diol.

EXAMPLE IV

A thick-walled glass reaction vessel was charged with 10 parts of the triol prepared in Example I. The vessel was cooled to —70° C. under a stream of nitrogen. To the vessel 40 parts of propylene oxide was added. The vessel was then heated to 140° C. and maintained at that temperature for 36 hours. After cooling, the product was removed from the vessel and stripped at 100° C. at reduced pressure to remove unreacted propylene oxide or other volatile side products. The oxypropylated product was found effective in lowering the surface tension of water.

What is claimed is:
1. Fluorine - containing triols represented by the formula

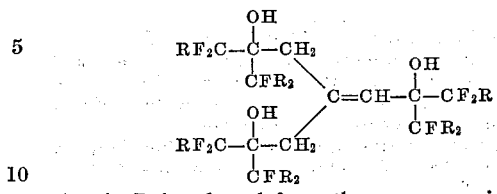

wherein R is selected from the group consisting of fluorine, chlorine, hydrogen, and alkyl having from 1 to 4 carbon atoms with the proviso that at least one R in each

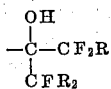

group is fluorine.

2. The triol of claim 1 when all nine R's are fluorine.
3. A process for the preparation of a triol of claim 1 which comprises reacting at temperatures between 150° C. and 300° C. for at least twelve hours, isobutylene with a ketone of the formula

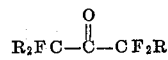

wherein R is selected from the group consisting of fluorine, chlorine, hydrogen, and alkyl having from 1 to 4 carbon atoms with the proviso that at least one R is fluorine in a mole ratio of ketone to isobutylene of at least 3:1.

4. The process of claim 3 wherein the ketone is hexafluoroacetone.

References Cited

UNITED STATES PATENTS 3,324,187  6/1967  Litt et al. _____ 260—633

LEON ZITVER, *Primary Examiner.*

H. MARS, *Assistant Examiner.*